May 8, 1951   E. V. BOREL ET AL   2,552,395
ELECTRIC GLASS FURNACE
Filed May 2, 1947   2 Sheets-Sheet 1
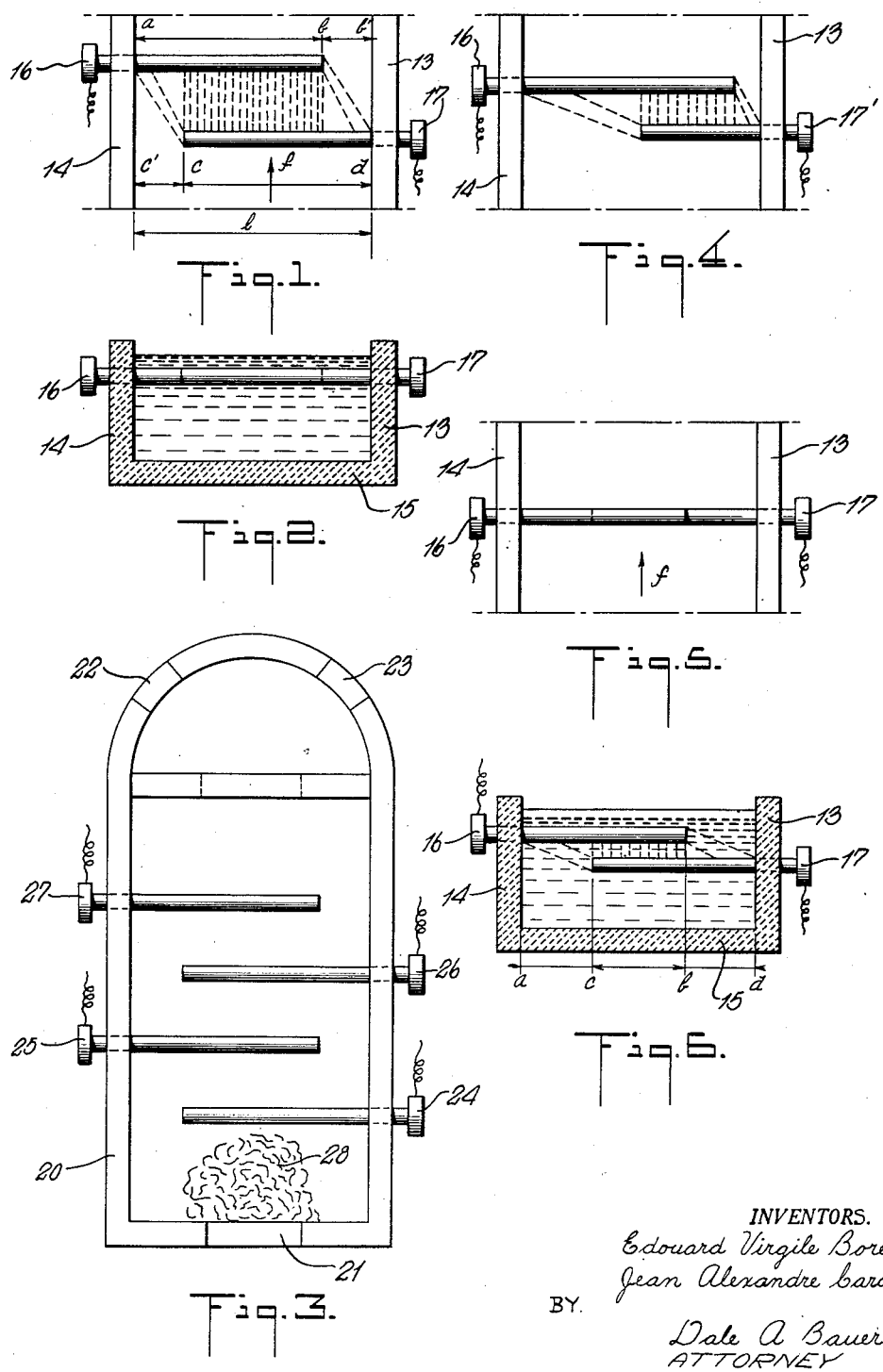
INVENTORS.
Edouard Virgile Borel
Jean Alexandre Cardot
BY
Dale A Bauer
ATTORNEY May 8, 1951 E. V. BOREL ET AL 2,552,395
ELECTRIC GLASS FURNACE
Filed May 2, 1947 2 Sheets-Sheet 2
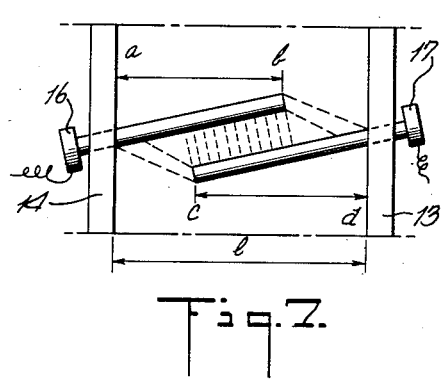
Fig.7.
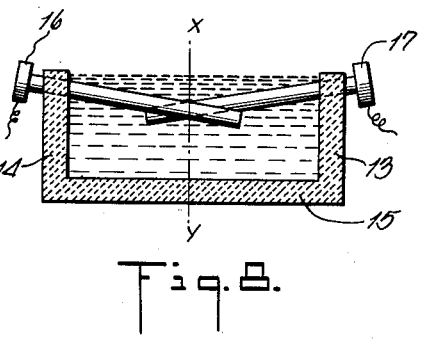
Fig.8.
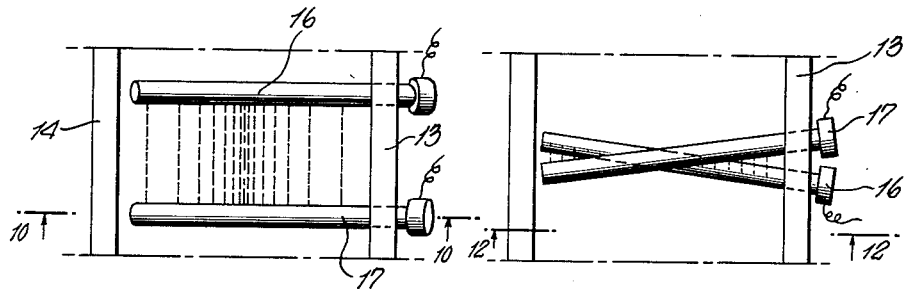
Fig.9. Fig.11.
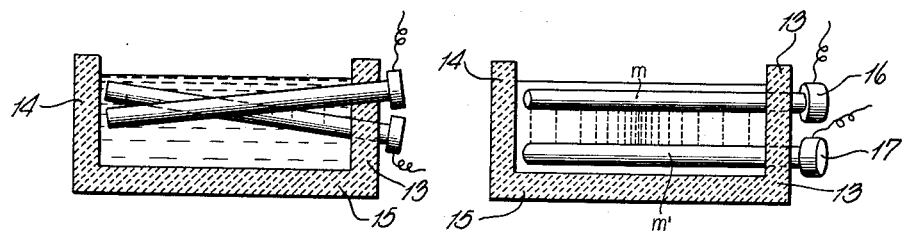
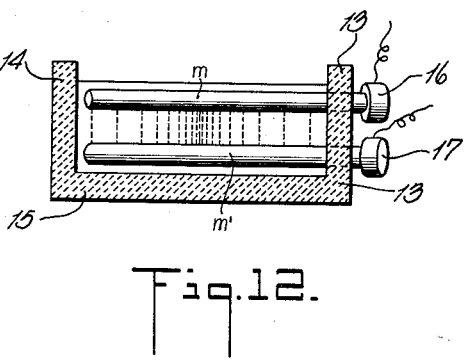
Fig.10. Fig.12.
INVENTORS.
Edouard Virgile Borel
Jean Alexandre Cardot
BY
Dale A. Bauer
ATTORNEY Patented May 8, 1951

2,552,395

UNITED STATES PATENT OFFICE 2,552,395

ELECTRIC GLASS FURNACE

Edouard Virgile Borel, Vevey, Switzerland, and Jean Alexandre Cardot, La Chapelle-Saint-Mesmin, France, assignors to Societe Anonyme des Manufacturers des Glaces et Produits Chimiques de Saint-Gobain, Chauny & Cirey, Paris, France Application May 2, 1947, Serial No. 745,436
In France May 7, 1946

6 Claims. (Cl. 13—6)

This invention relates to a process of making glass and to an electric glass furnace of the sort that employs electrodes immersed in the glass to heat the glass by Joule effect, and it will be so described.

The invention relates to the manufacture of glass, or other analogous materials, by means of furnaces in which the material is heated by the passage of an electric current through the mass. It particularly concerns furnaces of the continuous type having a tank in which the materials move from an inlet for the raw materials to an outlet for the finished product, one of which is situated at one extremity of the tank, and the other at the opposite extremiy. In such furnaces it has been proposed to employ electrodes for heating the bath, which extend across the entire bath and through the opposite walls of the tank below the level of the glass bath, the point at which the electrode passes through the wall being sealed by appropriate means of known type, which need not be described in detail in this specification. These electrodes are in complementary or cooperating pairs and connected to different terminals of a source of current.

Such electrodes may be in the form of straight bars placed in the bath of the glass, penerating through the lateral walls of the furnace, and being in contact with the bath of glass up to the very walls. Such electrodes, because they are disposed transversally of the furnace, permit the current to pass through the bath along lines directed longitudinally of the furnace, and create in the bath of glass zones of heat that are well defined, seeing that they are enclosed between the lateral walls of the furnace and the electrodes which themselves have transverse position.

There are numerous cases where it is desired that the zone of heat while extending from one lateral wall of the furnace to the other should produce a more intense heat in one selected part of the zone, for example in the part centrally located between the lateral walls or, on the contrary, in a part adjacent to a wall. This is particularly desirable either to avoid a too intense heating of the refractory walls of the tank or to produce transversally of the glass bath the desired thermic conditions. The present invention provides for a new and simple method of accomplishing this result in tank furnaces.

It is an object of this invention to heat glass in a glass furnace by Joule effect with varying intensity of heat and to make it possible to select within the furnace the place at which the heat of greatest intensity is to be applied and the place or places at which heat of the least intensity shall be used.

It is another object of the invention to localize or to broaden the place of greatest heat intensity so that under some circumstances the place of greatest intensity will be in a line, whereas in other cases it will be in a plane or zone.

Another object of the invention is to apply the principles preferably to continuous type furnaces, but also to discontinuous type furnaces.

The objects of the invention are accomplished by a glass tank furnace in which at least two of the electrodes between which the electric current circulates are straight electrodes penetrating in a known manner through the lateral walls of the furnace and in contact with the bath of glass up to the very walls, these electrodes being characterized in that their axes are not aligned and are separated from each other and that they occupy cooperating positions and have dimensions such that it is not possible to erect a common perpendicular except in a limited portion of their length. One method of carrying out the invention consists in disposing at least two electrodes parallel to each other through the walls of the furnace by openings beneath the level of the glass bath, one opening appearing in one wall and the other in the wall opposite, the length of each of these electrodes projected upon a perpendicular to the wall being less than the width of the furnace between the walls, and the sum of the projections of these two electrodes on the perpendicular being superior to that length.

Under these conditions no operating electrode reaches the wall opposite that by which it entered the furnace, and the electrodes are directly opposed except in the neighbourhood of these two walls of the furnace. In this way, the current passes by preference into the zone where the electrodes are adjacent, producing a concentration of heat in this zone and heat of reduced intensity in the neighbourhood of the walls. Furthermore, because the sum of the lengths of the electrodes compared to the width of the furnace exceeds that width, the two electrodes are overlapped, one by the other, so that there is obtained by means of this combination of two electrodes a material obstruction to the movement of the glass of which the effect extends throughout the total width of the furnace. There is thus obtained from this point of view an effect analogous to that given by the electrodes, each of which extends entirely across the furnace.

Another method of accomplishing the invention involves disposing at least two electrodes in directions not parallel to each other and which do not touch each other, these electrodes penetrating the bath of glass by orifices beneath the surface in the same wall or in different walls of the furnace.

Under these conditions, one uses electrodes of which the distance from a point of one to the other varies from one side to another of the furnace, presenting its least value in the neighbourhood of the common perpendicular between the electrodes. The electric current therefore tends to pass more easily in the region of the bath where this common perpendicular is located than in other regions situated between the electrodes, thus accomplishing the object of localizing heat that is desired. In the case where one wishes the quantity of heat to be greatest in the central part of the furnace, the electrodes are so placed that their common perpendicular is found in this central part.

According to the invention, it is possible to provide a tank furnace with at least a pair of cooperating electrodes extending from the tank wall into and between the top and bottom of the glass in the tank, the cooperating electrodes having parts at a distance from the wall that are at a least distance from each other and having those of their parts closest to the wall at a greater distance from each other.

There is described hereinafter, simply by way of example, different means of accomplishing the invention described above, reference being had to the accompanying drawings wherein all showings are diagrammatical and Figs. 1 and 2 show respectively a partial plane view and a vertical section of an apparatus embodying a construction conforming to the principles of the invention;

Fig. 3 is a plan view of a furnace tank operating by means of parallel electrodes in accordance with the principles of the invention;

Fig. 4 is a partial plan view of a modification of Fig. 1;

Figs. 5 and 6 are respectively a partial plan view and a vertical section of another modification of Fig. 1;

Fig. 7 is a partial plan view of a disposition of parts in which the electrodes are horizontal and parallel to each other but are inclined with respect to the walls of the furnace;

Fig. 8 is a vertical sectional view in which the electrodes are inclined with respect to each other while being situated in different planes perpendicular to the walls of the furnace;

Figs. 9 and 10 are respectively a partial plan view and a section of the structure of Fig. 8 in which the electrodes cut through one wall of the furnace; and Figs. 11 and 12 are respectively a plan view and a section of a construction in which the electrodes are horizontal but at different levels and follow different directions across each other.

In Figs. 1 and 2, 13, 14 are parts of the wall of a furnace tank and 15 is the bottom of the tank. Complementary or cooperating electrodes 16, 17 project into the tank through the side walls in parallelism to each other. The electrodes are straight bar electrodes that do not extend entirely across the tank, their free ends being spaced from the wall opposite that by which they are supported in the tank. An arrow F shows the direction of movement of the glass in the tank from the inlet toward the outlet. Current is passed into the glass bath between electrodes 16 and 17, connected to two different terminals of a source of electrical current. The current employed may be such as is customarily used to attain a Joule effect in a tank of molten glass. These electrodes are in a horizontal plane near the surface of the bath. They have a length less than the width $l$ between the walls 13, 14. It will be seen by reference to the dash lines that the least distance between electrodes 16 and 17 is between the overlap of these electrodes, and that a greater distance exists between the inner end of one electrode and the portion of the other electrode at the wall. Thus, although the bath in the neighborhood of the two walls is not deprived of current, it has a region of low current density compared to the central region. The central region is more highly energized and may be made to employ almost the entire current by regulating the extent of overlap and the distance of the electrode ends from the opposite wall. Consequently, the current brought into the bath is concentrated in a zone at the least distance between the electrodes.

Considering the projection $ab$ of the electrode 16 in a direction perpendicular to the walls 13 and 14, and the analogous projection $cd$ of the electrode 17, it is stated that in conformity with the invention $ab$ plus $cd$ is greater than $l$; that is to say, the length of each electrode considered with respect to the width of the furnace is greater than the part of the furnace not traversed by the other electrode. Thus, $ab$ is greater than $cc'$, and $cd$ is greater than $bb'$. Because of this, a current of glass moving in the direction of the arrow F with motion generally parallel to the walls will at least encounter the electrode 16 if the current is found between $a$ and $b$, and it encounters the electrode 17 if the current is between $b$ and $b'$. Thus, the electrodes, between them, cover the whole width of the furnace considered in relation to the arrow F and constitute a material obstruction for the glass situated at their level. In the case shown in the drawing, where the electrodes are in a plane near the free surface of the bath, they constitute a material obstacle with respect to the upper layers of the glass bath; that is to say, the depths where, as is known, are gathered, as the case may be, because of their light density, vitrefiable materials not yet completely melted, or glass molten but not yet refined. Electrodes are therefore serviceable in holding the glass in the zone where it is found until its fusion or its fining has been completed.

In Fig. 3 is shown a furnace of continuous type having a wall 20, an inlet orifice 21, outlet orifices 22, 23, and electrodes 24, 25, 26, 27, of which two are connected to one terminal and two to the other terminal, by way of example. A mass of unmolten raw material is shown at 28. The molten material follows a course during which it is raised to elevated temperature by action of the electric current passing between the electrodes. The current establishes hot zones analogous to those which are diagrammatically indicated in Figs. 1 and 2.

In Fig. 4 is shown an arrangement whereby electrodes 16, 17' have a narrower band of greatest temperature than electrodes 16, 17 of Fig. 1, this band being delimited by the length of the overlap. In Fig. 4 the electrodes are both in the same horizontal plane and perpendicular to the walls, but do not penetrate into the bath the same distance so that the zone of the bath where both are found is nearer one part of the lateral wall than the opposite part. This gives a particularly simple means of regulating the temperature of the furnace notably where, as often occurs in industrial practice, the furnace has one wall that tends always to be hotter than the other. In this case the hottest zone is moved toward the right to compensate for the presumed coolness of that wall.

In Figs. 5 and 6, the electrodes represented are the same as those of Fig. 1, but they are arranged vertically rather than horizontally, and they delimit a zone $cb$ where the intensity of the heat is greatest and two zones $ac$ and $bd$ where it diminishes toward the outside. The width of this central hot zone can be extended by spacing the two electrodes further apart in a vertical direction.

In Fig. 7 the two electrodes are parallel to each other and in the same horizontal plane, but are set at an angle to the side walls of the tank. In so mounting these electrodes the principles set forth above, that projections $ab$ and $cd$ are aligned perpendicular to the walls, that they shall each be inferior to the width $l$, but that the sum of $ab$ plus $cd$ shall be superior to $l$, are observed.

In Fig. 8 is an interesting arrangement in which the greatest density of current is concentrated on a single line extending between two points at which the plane $xy$ cuts the crossed electrodes. The electrodes are situated in vertical planes perpendicular to the walls but are oblique to the horizontal and symmetrical with respect to the longitudinal axial plane $xy$. This concentrates the heating in the central zone because the electrodes are at no position parallel to each other except in the single line at which a common perpendicular can be erected. All other lines drawn between the two electrodes are of greater length and of less current density.

The same principle is employed in Figs. 9 and 10 wherein the electrodes are admitted to the furnace through adjacent portions of the wall rather than through opposed portions. These opposed portions are displaced with respect to each other, and the electrodes are angled so that the current is concentrated along the shortest line, producing along that line a region of greatest heat. The electrodes can be carried to as close proximity to the opposite portion of the wall as is desired, and the effect of temperature in that neighborhood can be controlled by appropriate selection of the angle between the electrodes. The zone of heating created by the current that passes between the two electrodes extends practically across the furnace and offers a substantial obstruction to all the glass at that level. This location of the maximum intensity of current along the longitudinal axis of the furnace has the advantage, with respect to the total energy consumed, of attaining in one locality a very high temperature remote from the walls of the furnace.

In Figs. 11 and 12 the electrodes are situated in different horizontal planes and are crossed.

The common perpendicular $m'n'$ of the two electrodes is, in the example under discussion, a vertical line situated in the axial longitudinal plane of the furnace from which it follows that the two electrodes represented establish a zone of heating extending from top to bottom and from one lateral wall to the other, presenting a maximum intensity in the middle of the furnace.

This disposition of electrodes presents the particularity that the region of the furnace that they occupy is but little extended in the longitudinal sense, which is an advantage when it is necessary to establish a hot zone in a furnace of small size.

Properly understood, the invention is not limited to the forms which have been described and shown nor to the fact that the furnace is of continuous type. The invention is applicable notably to discontinuous furnaces of daily type in which the material is subjected in one place to a succession of heating operations or treatments that are necessary to the elaboration of glass. It is equally applicable to employment with different types of electrodes that do not extend throughout the whole width of the furnace and includes all electrodes which employ two straight elements that constitute prolongations of each other and penetrate the opposite walls of the furnace.

An advantage of the invention is that it allows to localize the position of the hottest zone so that the walls of he furnace be not subjected to the most intense heat, and that they have less tendency to dissolve in and contaminate the bath. They last longer, require fewer repairs, and entrain fewer shutdowns of the apparatus for repairs. Another advantage concerns the concentration of heat and the employment of high temperatures at determined points and for example at insulated distance from the walls. It is of advantage to attain very high temperatures particularly during fining. By concentrating the heat at a place remote from the walls without allowing the glass at the walls to reach an undesirably low temperature, an improved product is obtained. The area of Joule effect can be arranged in parallel to or across the glass stream. The region of highest temperature can be made wide or narrow. The ratio of heat expended in mid-stream to that expended at the wall can be varied controllably. By concentrating the heat where desired, the consumption of current is lowered.

As many apparently widely different embodiments of the present invention may be made without departing from the spirit and scope thereof, it is to be expressly understood that the invention is not limited to the specific embodiments, except as defined in the appended claims.

We claim:

1. A glass furnace having straight sidewalls, an electrode circuit including two rod electrodes projecting laterally into the tank below the glass level and serving for the passage of Joule effect current through the glass in the tank, the parts of said electrodes exposed to glass being materially shorter than the width of the tank, said electrodes overlapping, being at a least distance from each other in their overlapped parts, and having their overlapped parts remote from the walls of the furnace.

2. The glass furnace of claim 1 in which the electrodes are mounted in opposite walls and have overlapped end portions.

3. The glass furnace of claim 1 in which the electrodes are mounted in the same wall, extend into the glass at different angles, and cross each other in a location remote from the furnace walls.

4. The glass furnace of claim 1 in which the common perpendicular to two co-acting electrodes is substantially vertical.

5. The glass furnace of claim 1 in which the common perpendicular to two co-acting electrodes is substantially horizontal.

6. The glass furnace of claim 1 in which the electrodes are of different length.

EDOUARD VIRGILE BOREL.
JEAN ALEXANDRE CARDOT.

(References on following page)

REFERENCES CITED

The following references are of record in the file of this patent:

UNITED STATES PATENTS

| Number | Name | Date |
|---|---|---|
| 1,594,496 | Clark | Aug. 3, 1926 |
| 2,123,544 | Morton | July 12, 1938 |
| 2,137,930 | Turk | Nov. 22, 1938 |
| 2,225,616 | Borel | Dec. 24, 1940 |
| 2,225,617 | Borel | Dec. 24, 1940 |
| 2,262,069 | Turk | Nov. 11, 1941 |
| 2,263,549 | Peyches | Nov. 18, 1941 |
| 2,267,537 | Romazzotti | Dec. 23, 1941 |
| 2,277,678 | Borel | Mar. 31, 1942 |
| 2,277,679 | Borel | Mar. 31, 1942 |
| 2,313,217 | Borel | Mar. 9, 1943 |
| 2,331,946 | Von Pazsiczky et al. | Oct. 19, 1943 |

FOREIGN PATENTS

| Number | Country | Date |
|---|---|---|
| 489,207 | Great Britain | July 21, 1938 |
| 498,379 | Great Britain | Jan. 6, 1939 |
| 540,103 | Great Britain | Oct. 6, 1941 |
| 875,331 | France | June 15, 1942 |